US012572127B2

(12) United States Patent
Schulz et al.

(10) Patent No.: US 12,572,127 B2
(45) Date of Patent: Mar. 10, 2026

(54) METHOD FOR PROVIDING A SERVICE-BASED CONTROL APPLICATION FOR AN INDUSTRIAL PLANT

(71) Applicant: ABB Schweiz AG, Baden (CH)

(72) Inventors: Dirk Schulz, Meckenheim (DE); Anders Trosten, Västerås (SE); Mario Hoernicke, Landau (DE); Linus Thrybom, Västerås (SE)

(73) Assignee: ABB Schweiz AG, Baden (CH)

( * ) Notice: Subject to any disclaimer, the term of this patent is extended or adjusted under 35 U.S.C. 154(b) by 445 days.

(21) Appl. No.: 18/163,355

(22) Filed: Feb. 2, 2023

(65) Prior Publication Data

US 2023/0244205 A1 Aug. 3, 2023

(30) Foreign Application Priority Data

Feb. 3, 2022 (EP) .................................... 22154949

(51) Int. Cl.
  *G05B 19/05* (2006.01)
(52) U.S. Cl.
  CPC ......... *G05B 19/058* (2013.01); *G05B 19/056* (2013.01)
(58) Field of Classification Search
  CPC ............................ G05B 19/058; G05B 19/056; G05B 19/0421; G06F 9/5066; G06F 8/31; G06F 9/4484; G06Q 50/04
  See application file for complete search history.

(56) References Cited

U.S. PATENT DOCUMENTS

| | | | |
|---|---|---|---|
| 2013/0218299 A1 | 8/2013 | Jie et al. | |
| 2017/0078168 A1* | 3/2017 | Harris, Jr. | ........... H04L 63/0263 |
| 2018/0316729 A1 | 11/2018 | Chauvet et al. | |
| 2020/0371901 A1* | 11/2020 | Sastry | ................. G06F 11/3692 |
| 2021/0208561 A1 | 7/2021 | Vogt | |

FOREIGN PATENT DOCUMENTS

EP 3594809 A1 1/2020

OTHER PUBLICATIONS

Heiko Koziolek, "A classification framework for automated control code generation in industrial automation", 2020, Elsevier, The Journal of Systems and Software, 166 (Year: 2020).*
European Patent Office, Extended European Search Report in European Patent Application No. 22154949.6, 9 pp. (Jul. 8, 2022).

(Continued)

*Primary Examiner* — Christopher W Carter
(74) *Attorney, Agent, or Firm* — Fitch Even Tabin & Flannery LLP

(57) ABSTRACT

A computer-implemented method for providing a service-based control application for an industrial plant includes automatically segmenting an initial control code for the industrial plant into a plurality of code blocks and automatically creating a plurality of services, each service implementing the functionality of one or more of the plurality of code blocks. The automatically creating of the plurality of services is carried out considering a similarity of a criticality assigned to each of the plurality of code blocks, such that code blocks having more similar criticality are more likely to be implemented within the same service.

14 Claims, 5 Drawing Sheets

(56)  References Cited

OTHER PUBLICATIONS

Petazzoni, "The Quest for Minimal Docker Images: part 3," downloaded from the Internet on Mar. 15, 2023, at https://jpetazzo.github.io/2020/04/01/quest-minimal-docker-images-part-3/, 13 pp. (Apr. 1, 2020).

Vigliarolo, "AWS Firecracker: 10 things every tech pro should know," *TechRepublic,* 4 pp. (Feb. 20, 2019).

Wahler et al., "Disruption-free software updates in automation systems," abstract, *Proceedings of the 2014 IEEE Emerging Technology and Factory Automation (ETFA),* 1 p. (Sep. 16-19, 2014).

* cited by examiner

<u>S31</u>
Obtain information as to where the respective
service should be carried out <u>S32</u>
Carry out first subset of
services on local
computing system <u>S32</u>
Carry out second subset
of services on edge
computing system <u>S32</u>
Carry out third subset of
services on cloud
computing system

METHOD FOR PROVIDING A SERVICE-BASED CONTROL APPLICATION FOR AN INDUSTRIAL PLANT

CROSS-REFERENCE TO RELATED APPLICATIONS

This patent application claims priority to European Patent Application No. 22154949.6, filed on Feb. 3, 2022, which is incorporated herein in its entirety by reference.

FIELD OF THE DISCLOSURE

The present disclosure relates to a method for providing a service-based control application for an industrial plant, the use of the application, a data processing system, a computer program product, and a computer-readable medium, a method and system for encrypted messaging.

BACKGROUND OF THE INVENTION

At present, control applications for industrial plants are often implemented along the physical process topology or material flow and they are partitioned into code blocks to fit the performance of dedicated hardware, e.g., PLCs, that is on-premises on the industrial plant. This partitioning is a manual task, regardless of whether IEC 61131 languages are used to create rather monolithic code or IEC 61499 with more fine granular automation functions. In any case, the use of dedicated control hardware allows for high reliability and short response times. However, this approach also has drawbacks, for example, when it comes to hardware maintenance, firmware and application updates, and required on-premises hardware capabilities and reliability.

Although for some data-driven industries cloud-based or edge-server based solutions, for example open, partly externalized edge computing environments as a service (e.g., Multi-access Edge Computing, MEC, for example 5G MEC), have become more widely used, the requirements in terms of reliability and response times make it difficult to move to such technologies when it comes to control applications for industrial plants. In general, most code blocks may contain automation logic that is too critical for deploying them non-locally.

An automation engineer thus must decide whether or not control code for a dedicated control hardware should run locally in view of these requirements and, when in doubt, has to take a conservative approach. Consequently, advantages of cloud and edge-server capabilities are not fully leveraged.

BRIEF SUMMARY OF THE INVENTION

The present disclosure provides a computer-implemented method for providing a service-based control application for an industrial plant. The method comprises automatically segmenting an initial control code for the industrial plant into a plurality of code blocks and automatically creating a plurality of services, each service implementing the functionality of one or more of the plurality of code blocks. The automatically creating of the plurality of services is carried out considering a similarity of a criticality assigned to each of the plurality of code blocks, such that code blocks having more similar criticality are more likely to be implemented within the same service.

In other words, an application, particularly control code, may be partitioned or packaged based on criticality for the related process as metric. This allows for later deploying the application based on minimal performance needs and cost, rather than, for example, based on PLC hardware or virtual container limits. Examples for the metrics for segmenting initial code and grouping the resulting code blocks into services may include computational and communication overhead during normal operation, updates, or fail-over, among others, as will be explained in more detail below.

The control application obtained by means of the method of the present disclosure may be referred to as a service-based control application.

The service of the present disclosure may also be referred to as a nano-service and creating a service may be referred to as nano-packaging. Such nano-packaging, for example, also allows for fine granular updates of code. The granularity of the services will be dependent on the initial control code at hand, such that one might refer to the services as nano-services or micro-services.

The initial control code and the control application may each comprise functionality for controlling operation of pieces of equipment of the industrial plant and, optionally, functionality for monitoring operating conditions and/or operation of pieces of equipment of the plant.

The control application of the present disclosure may, for example, be a collection of the created services and some additional code, for example glue code, as outlined in detail below. The additional code may ensure proper communication between services and/or within services. This will be explained in more detail below.

Accordingly, when creating services from code blocks and when creating a control application based on the services, changes to the code may be made to ensure compatibility and communication among code blocks within the services and between services. Thus, when looking at the entire control application and/or the entire set of services together, this may not correspond to the initial code. This is also discussed in more detail further below.

It is noted that the segmenting initial control code may be performed in different ways. For example, the initial control code might be broken down into very small pieces and then grouped back together, or it may be successively broken down in several steps, or it may immediately be brought into the desired granularity in just one step.

Moreover, for the sake of completeness, it is noted that in the step of automatically creating the plurality of services, in addition to considering a similarity of a criticality assigned to each of the plurality of code blocks, additional criteria may be considered, e.g., amount of overhead or the like.

As can be seen from the above, according to the present disclosure, the method may split a (even large) control application into a plurality of, preferably small, parts, the code blocks, that have only indirect dependence, e.g., single loops. The code blocks may then be grouped deployed as part of (nano-)services on a distributed, heterogeneous computing environment, for example, comprising one or more PLCs, local edge clusters, 5G MEC service offerings, and cloud plans, i.e., a large and diverse connect and compute ecosystem. Particularly, the services may be deployed on nodes that "just fit" regarding the required performance level.

Thus, for example, it is possible to split an initial control application and characterize the pieces in a way that allows for obtaining a service-based control application having parts that are distributed across a heterogeneous computing environment on nodes with sufficient performance at lowest cost.

The method of the present disclosure, in automatically segmenting the initial control code, may split the initial control code into execution units that have a pre-determined degree of independence from each other. A degree of independence may be expressed as required execution QoS (reliability, acceptable fail-over time) or dependency/distance in the controlled process.

For the segmenting and/or the creating of the services, some indicators may be derived from the code (e.g., units, naming conventions), and/or from the DCS (e.g., alarm criticality related to signal limits) and/or from engineering data. Thus, by integrating or recapturing engineering data and exposing DCS-objects, data for the segmenting and/or creating of the services can be obtained.

For sake of completeness, the method of the present disclosure goes beyond any capabilities offered by the currently available standards, including but not limited to IEC 61131, IEC 61499, or VDINDE/NAMUR 2658 for modular processes. However, these standards can still be leveraged and the present method, as will also be seen below, is also applicable for modular applications.

Methods of the present disclosure allow for, open, partly externalized edge computing environments as a service (e.g., 5G MEC) being fully leveraged. Moreover, use of already known technologies for application virtualization, e.g., with Docker/Kubernetes, is possible. Moreover, continuous delivery and evergreen plants, particularly with seamless updates of applications, can be supported. Scalability may also be improved.

In the present disclosure, performing steps like segmenting and/or creating services automatically, leverages available data, for example engineering data, metadata, for example which process parameters are involved for certain service, or data on the topology of the machine/plant.

A service may, for example, be a live instance of packaged code comprising one or more code blocks. For example, a service may be obtained when packaged code is executed in a container. As an example, for compiled code may be packaged into a container image together with a manifest. The container image may be executed by a runtime environment, e.g., a Kubernetes runtime environment.

Further advantages of the method of the present disclosure are presented below.

BRIEF DESCRIPTION OF THE SEVERAL VIEWS OF THE DRAWING(S)

DETAILED DESCRIPTION OF THE INVENTION

Figure 1:
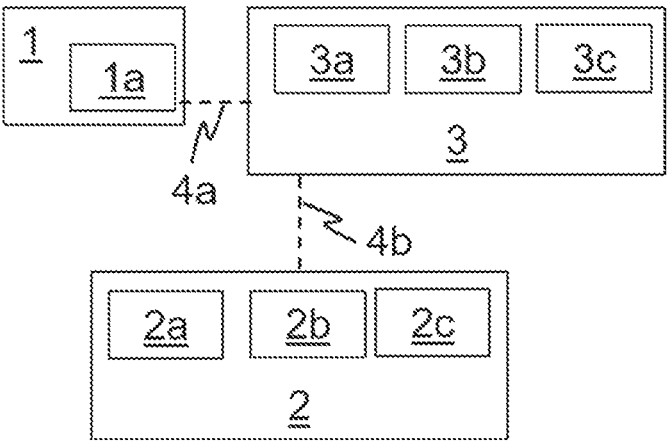
FIG. 1 illustrates a schematic representation of data processing system, and of an industrial plant and distributed computing system in accordance with the disclosure.

FIG. 1 shows a data processing system 1 according to the present disclosure, comprising means, for example a processor 1a, for carrying out the method of the present disclosure, for example one of the methods described below.

A system according to the present disclosure may optionally further comprise, as shown in FIG. 1, an industrial plant 2 comprising pieces of equipment 2a, 2b, and 2c. Moreover, as shown in FIG. 1, the system may optionally comprise a distributed, heterogenous computing system 3 comprising, as an example only, three functional portions 3a to 3c, i.e., a local computing system 3a situated at the site of the industrial plant, an edge computing system 3b associated with the industrial plant, and a cloud computing system 3c. Data connections 4a and 4b may optionally be provided for exchanging data between the distributed computing system and the data processing system 1 and/or between the industrial plant and the distributed computing system 3.

Figure 2:
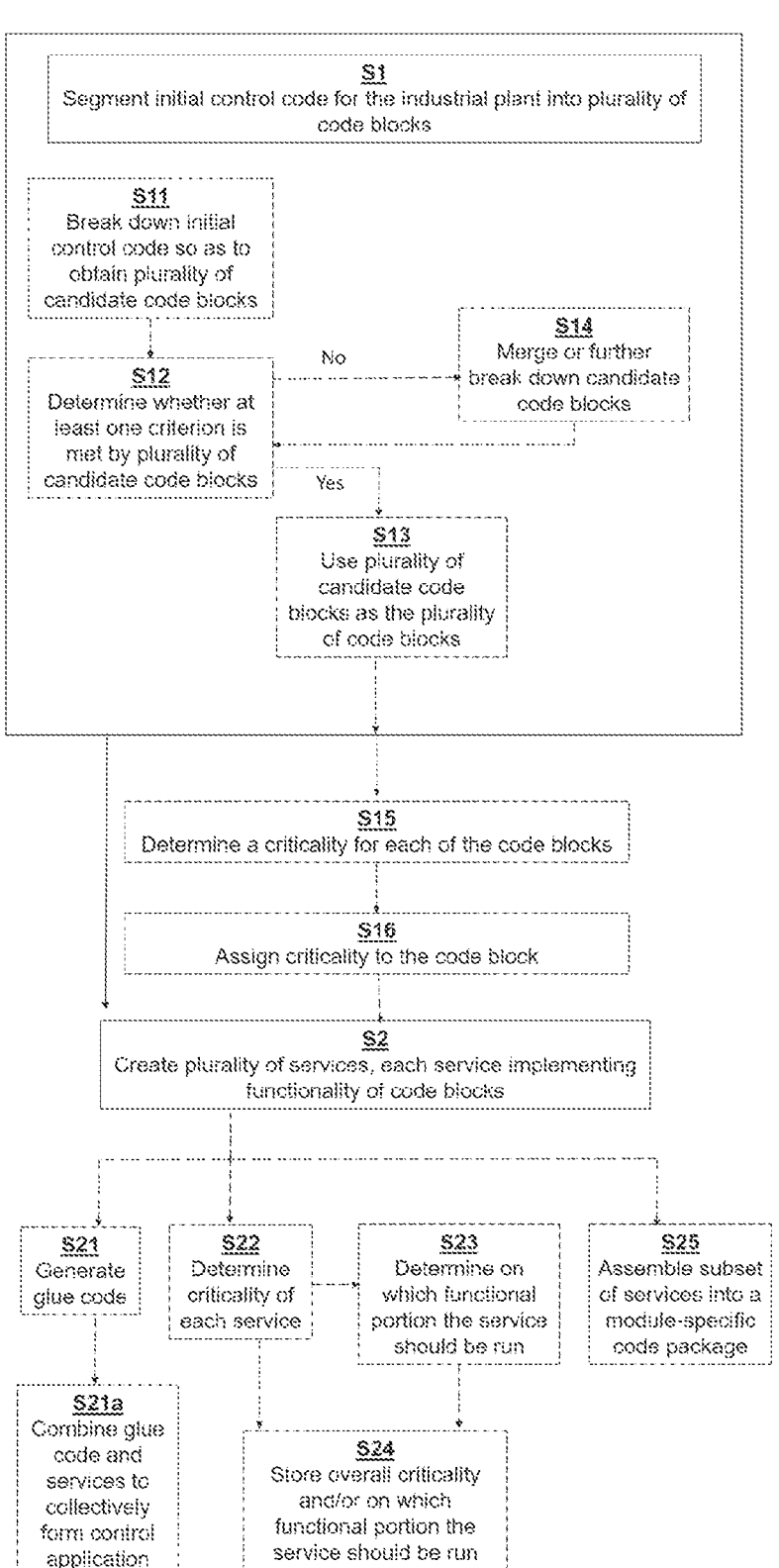
FIG. 2 is a flowchart illustrating a method according to the present disclosure.

FIG. 2 is a flowchart illustrating a method according to the present disclosure.

The method comprises step S1 of automatically segmenting an initial control code for the industrial plant into a plurality of code blocks and step S2 of automatically creating a plurality of services, each service implementing the functionality of one or more of the plurality of code blocks. According to the present disclosure, automatically creating of the plurality of services is carried out considering a similarity of a criticality assigned to each of a plurality of code blocks, such that code blocks having more similar criticality are more likely to be implemented within the same service.

The segmenting the initial control code into a plurality of code blocks can, in general, be performed in different ways. As a non-limiting example, the segmenting may comprise the optional steps S11 to S13. Alternatively, at least some of these steps may be performed prior to the segmenting the initial control code.

In optional steps S11, the initial control code is automatically broken down to obtain a plurality of candidate code blocks. For example, it may be broken down into functions and/or into the smallest possible units, like single loops.

Subsequently, in step S12, it is automatically determined whether at least one criterion is met by the plurality of candidate code blocks. For example, the criterion may reflect the expected amount of overhead in the control application when using the plurality of candidate code blocks as the plurality of code blocks.

If this is the case, in step S13, upon determining that the criterion is met, the plurality of candidate code blocks is used as the plurality of code blocks and the method proceeds to step S2, either directly or via the optional steps S15 and S16 described below.

Otherwise, in step S14, upon determining that the criterion is not met, the plurality of candidate code blocks is merged or further broken down to obtain a plurality of modified candidate code blocks and the method proceeds to step S12. Thus, the candidate code blocks are modified until they meet the criterion and then used as the code blocks in step S2.

In optional step S15, for each of the code blocks, a criticality, in the present example expressed by a vector of key performance indicators of one or more of the plurality of processes controlled and/or monitored by the code block is automatically determined. In optional step S16, the criticality is automatically assigned to the code block.

In optional step S21, glue code is automatically generated to ensure that any changes made to the initial code while segmenting the initial code and creating the services does not break the functionalities of the initial code. The glue code may, generate additional I/O variables, for example to allow for exchanging previously internal variables across code blocks that were separated while segmenting the initial control code. In optional step S21*a*, the glue code may be combined with the services to collectively form a control application.

If the method does not comprise step S21, the plurality of services may be combined, in step S2*a* to collectively form a control application.

In optional step S22, an overall criticality of the service is automatically determined, for each of the services, for example based on the criticality of the code block or code blocks implemented by the service.

In optional step S23, based on the overall criticality of the service, it is automatically determined on which functional portion of the distributed, heterogeneous computing infrastructure the service should be run. For example, in this step, it may be determined whether the service should be run locally on an edge node, or in the cloud. As an example, the decision may be made to select the functional portion having the lowest capabilities that still meet the requirements of the service in terms of criticality.

In optional step S24, the overall criticality and/or the functional portion on which the service should be run is stored in such a manner that the information is accessible to a computing system executing the control application. Thus, the information may later be used when running the control application.

It is noted that steps S22 to S24 may not necessarily be part of the method for providing a service-based control application for an industrial plant. Instead, some or all these steps may be part of a method of using the control application according to the present disclosure. This means that it need not necessarily already be determined upon creating the control application, how the services will be evaluated in terms of criticality and/or on which functional portions the service will run. In some cases, for adapting the control application, the step may be performed (at least also) upon using the control application at a given site and given time, for example based on the specific infrastructure at hand.

After creating the services, an optional step S25 may be performed, wherein a subset of the plurality of services that are involved in controlling and/or monitoring a piece of equipment of the plant are automatically identified and assembled into a code package that is specific to the piece of equipment, while still maintaining the individual services.

Figure 3:
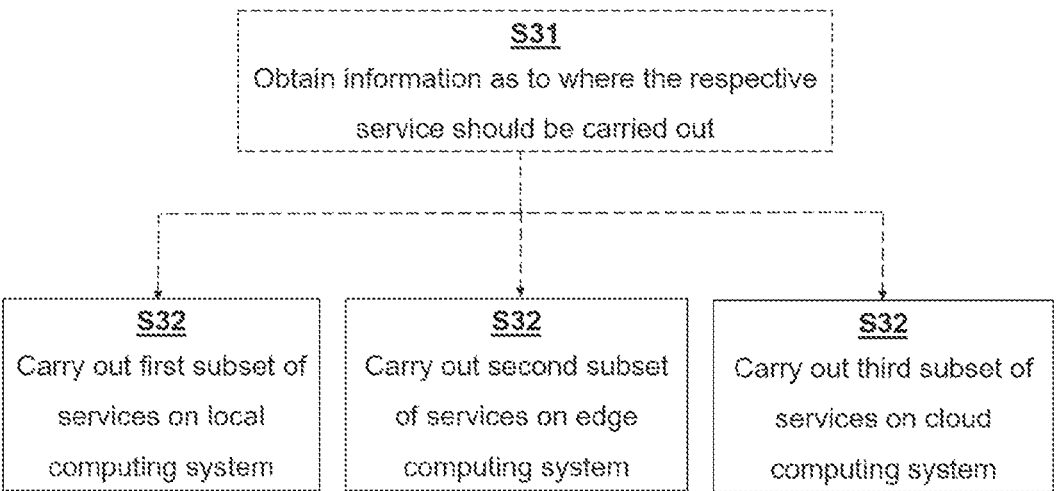
FIG. 3 is a flowchart illustrating another method according to the present disclosure.

FIG. 3 is a flowchart illustrating a method of using a control application obtained by a method according to the present disclosure. Specifically, the control application is used for controlling and/or monitoring the operation of an industrial plant, for example an industrial plant as described in the context of FIG. 1 or any other industrial plant.

The method comprises carrying out the control application in a distributed, heterogenous computing system comprising, as functional portions, a local computing system situated at the site of the industrial plant, and at least one of an edge computing system associated with the industrial plant and a cloud computing system. As an example, the distributed computing system may be a computing system as described above in the context of FIG. 1.

Carrying out the control application comprises the step S32 of carrying out a first subset of the services on the local computing system, the step S33 of carrying out a second subset of the services on the edge computing system, and the step S34 of carrying out a third subset of the services on the cloud computing system.

The method optionally comprises, prior to carrying out the control application, the step S31 of obtaining information as to where the respective service should be carried out. This information may have been determined according to any of the methods of the present disclosure, for example a method as described in the context of FIG. 2.

Method steps of another example of a method according to the present disclosure are provided below for the sake of illustration.

In a first step, an initial control code, for example an initial control application, is segmented into a plurality of code blocks. For example, it may be broken down or partitioned into smaller execution units, for example even into smallest possible execution units, e.g., individual loops. The integrity of a fragment is maintained from application perspective. In case the method is applied with modular-engineered plants, the partitioning may be defined on a module level once and then reused.

In a second step, the execution units may be aggregated by similarity, for example in terms of required reliability, acceptable fail-over time, dependency/distance in the process, QoS, or the like, and to balance containerization overhead, e.g., to optimize resource usage. In other words, the execution units are packaged into containers, also referred to herein as code blocks. In other words, some of the smaller execution units may also be merged again if deemed suitable from a technical point of view.

As can be seen from the above, the breaking down and optionally merging results in the plurality of code blocks.

The information for the segmenting and aggregation may, for example, be obtained from existing CAD and automation engineering data.

In a third step services may be obtained by grouping code blocks and in a fourth step the services may be deployed on a heterogeneous computing environment, preferably with a deterministic inter-container and/or inter-process communication to transfer states.

For the deployment, the required robustness, e.g., in terms of availability, reliability, and/or recovery time, may be defined for each service, for example to derive a redundancy level of instances, recovery mechanisms, and/or communication resources. For example, for some services the required recovery time may be on the order of 1 second, whereas for others the required recovery time may be on the order of only 10 ms.

In the present disclosure, specifically in the above-described first to third steps, at least some of the following steps may be performed, e.g., to identify execution units and their performance properties in the initial control code, to obtain code blocks, and/or to obtain services:
   a. Capturing loops, e.g. from P&ID diagrams;
   b. Identifying specifically open loops for monitoring;
   c. Analyzing signal flow or process dependencies between loops or in loop cascades;
   d. Interpreting physical quantities, e.g., temperature and/or pressure or the like, and relating them to predefined availability and timing profiles;
   e. Evaluating explicit signal update rates.

In order to avoiding breaking the code in steps 1 and/or 2, one or more of the following steps may be performed:
   a. Extracting logic;
   b. Identifying exchanged internal signals;
   c. Creating external I/O signal configuration for protocol stack;
   d. Generating glue code between logic and stack;
   e. Packaging logic, glue code, and stack, for example into a virtual container;
   f. Adding content identifier, e.g., a loop name.

Optionally, after auto-generation of code blocks and/or services and their characteristics, the results may be verified and approved by a human, e.g., an engineer.

In the present disclosure, specifically in the context of the above-described first to third steps, a similarity measure for execution units and/or code blocks may be determined. For example, similarity may be determined based on controlled points, for example I/O, in a process. Specifically, for example, similarity regarding the process, e.g., derived from CAD or P&ID data, may be determined based on spatial distance (straight line) of the execution units in the process and/or by using the number of intermediate process units or modules in the process, e.g., following a material flow. For example, level control for two neighboring tanks would have a distance of "1." Alternatively, or in addition, similarity may be determined in terms of code execution properties, e.g., from timing configurations, units indicating the physical quantity, naming conventions for safety or interlocking, alarm criticality of the used signals, or the like. Factors considered may be one or more of latency or round-trip time (RTT), criticality of the loop, e.g., depending on the speed of change of the physical quantities (e.g., quantified as $^\circ$ C./s or m$^3$/s$^2$). A loop might, for example, be flagged, in terms of criticality, as relevant for product quality, for safety, or only for monitoring (e.g., no closed loop).

In the present disclosure, specifically in the above-described first to third steps, the aggregating of execution units or grouping of code blocks by similarity may be performed as follows.

Execution units that are sufficiently similar, e.g., have the same or sufficiently similar QoS profiles, can be aggregated. For example, code units may be merged, or partitioning could be selectively backtracked. Thus, code blocks are obtained, and similar code blocks can be grouped into services based on the characteristics of the code blocks.

As mentioned above, aggregating the code units allows for optimizing memory, CPU, communication, and management overhead for containers. For example, with redundancy, states need to be transferred in any case, but with less header overhead on the network. Similarly, data from a single remote I/O should preferably not be decrypted by many containers only to extract one signal each. In addition to performance needs of the process, the I/O mapping could be considered for aggregation.

In the present disclosure, specifically in the above-described fourth step, an auto-defining of service deployment in a heterogenous environment may be performed as follows. For each service, a node cluster that meets the required execution speed, reliability/fail-over time, and internal signal exchange speed may be determined and it may further be determined whether communication to other node clusters fulfills external signal exchange speed and reliability requirements (for each pair of clusters, such properties must be obtainable from the communication infrastructure). In other words, for selecting a node, the node capabilities and communication capabilities within a network of nodes may be considered. Depending on the computing environment, it may be advantageous to select a node that just fulfils the requirements.

As an example, safety code may be run on dedicated and certifiable controllers, loops with 5 ms or less RTT may be run on a local edge cluster, e.g., with gigabit TSN Ethernet, slower loops may be run on a 5G mobile edge, and data analytics may be run on the cloud over the Internet. The latter may have high latency, but generally also has the lowest cost. It is noted that in some cases, e.g., purely supervisory signals, signals might not have any associated computation, but in any case, may need to be shown on local operator graphics, and, thus, may potentially not pass through 5G MEC or the cloud.

Some further aspects and examples of the present disclosure will be outlined below.

In terms of redundancy and state transfers, services of the present disclosure may be started with a given availability measure or and explicit redundancy level. To this end, in addition to I/O signals, a nano-service may expose internal state variables to be synchronized with its redundant instances. The mechanisms to configure and execute the state transfer may then be the same as for I/O signals (e.g., needed bandwidth and latency along with network availability/redundancy measure for the data transport).

In terms of applying load-evaluate-go, LEG, updates with the services of the present disclosure, multiple services flagged as evaluation candidates may be deployed. The behavior of candidate code may be evaluated, e.g., as with regular LEG. A synchronized activation of new code and deactivation of old code may be performed.

A network-centric architecture may be used to aggregate code onto a controller hardware by common criticality of the loops, not the spatial colocation of I/O signals coming from a Fieldbus segment. Thus, wasted redundancy can be prevented.

A network-failure tolerant application level for containers may be provided. Extended container network/connectivity functions may be provided to use last good value for configurable point in time. An alarm may be raised about missing new values, but the service may continue running until time is out before "I/O status" goes to "bad state."

Preferably, when preparing new pieces of code for the control application of the present disclosure, e.g., when writing code, particularly when leveraging modular engineering, the method of the present disclosure for providing the (service-based) control application may already be considered or at least partially performed at design time. In that case, execution characteristics may already be stored alongside the code for future use. New code may be written as native nano services or based on IEC 61499 with added characteristics.

Figure 4:
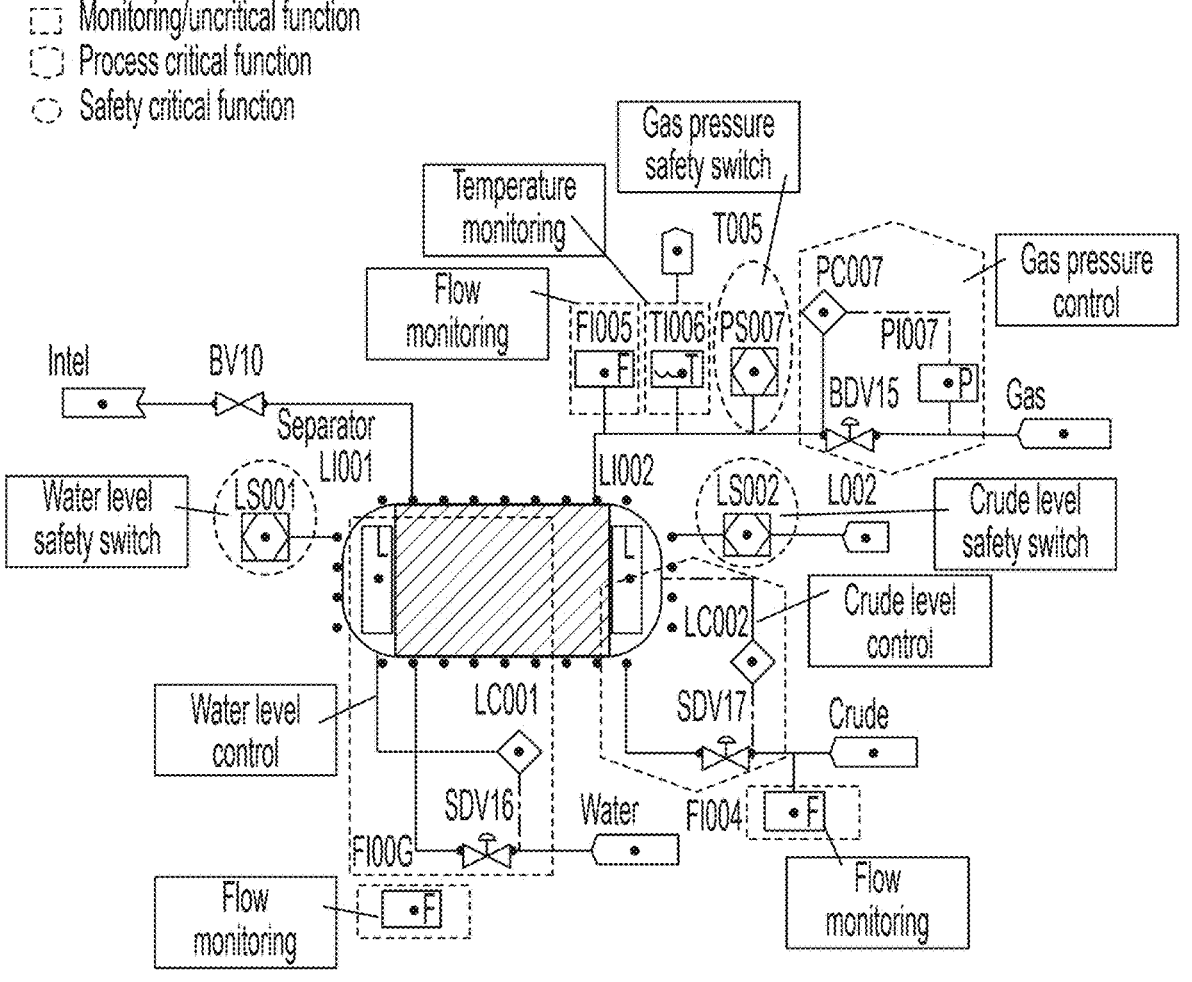
FIG. 4 is a schematic, not to scale representation of at least part of an industrial plant.
Figure 5:
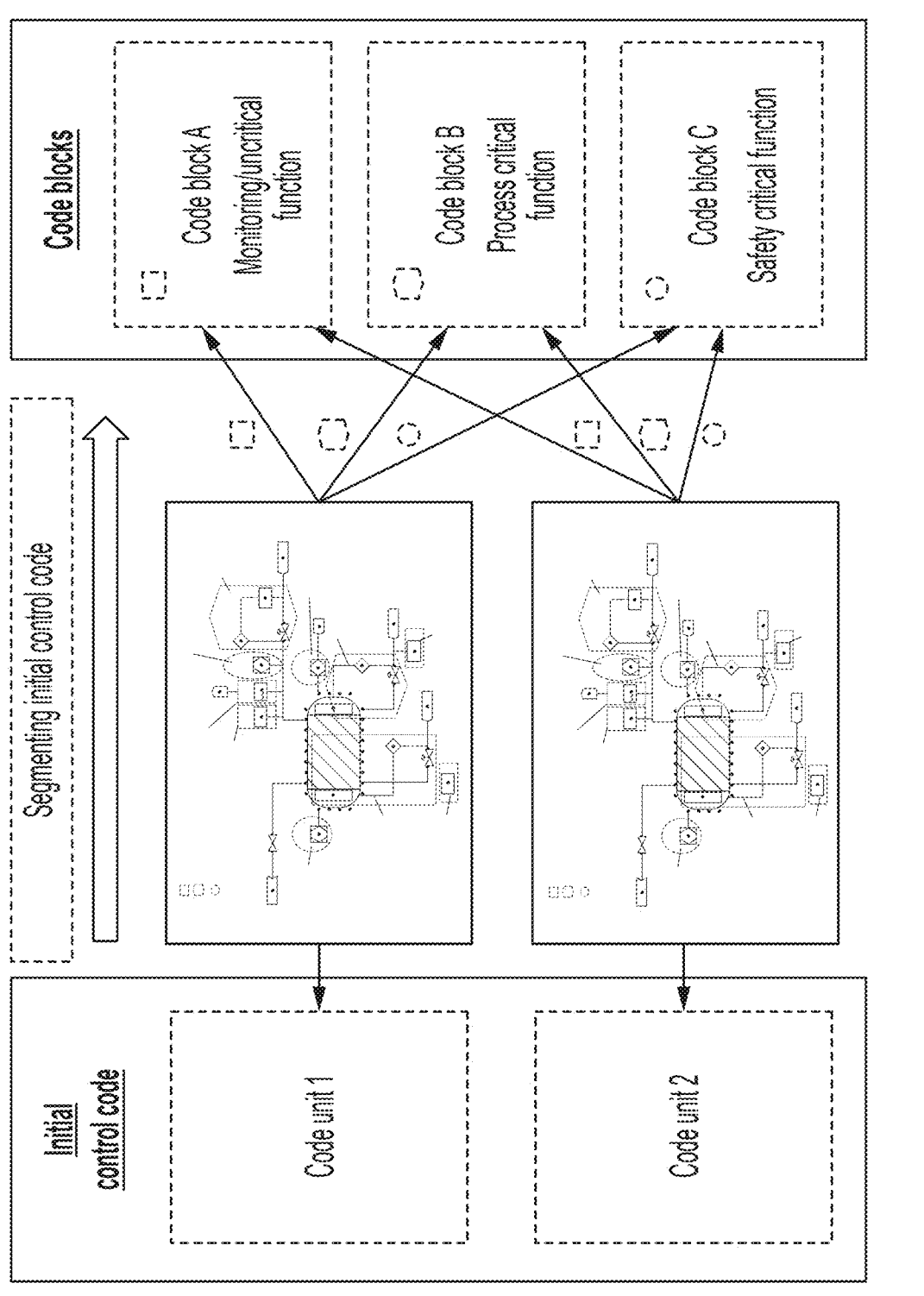
FIG. 5 illustrates the concept of segmentation of control code for an industrial plant.

Another specific example for the method of the present disclosure is shown in FIGS. 4 and 5. The example pertains to a separator process for upstream oil and gas plants. A separator in this example is a three-phase separator configured to separate the water, gas, and the oil, but alternatively it could also be configured to only separate two phases, e.g., only oil and water. FIG. 4 illustrates the process and highlights, with dashed rectangles, hexagons, and circles, respectively, which parts represent uncritical functions, which parts represent process critical functions, and which parts represent safety critical functions.

Through element BV10, the output of well heads flows into a vessel. The vessel is set to be under pressure to separate the water, gas, and the oil. Gas is flowing out through the top pipe, water and oil through the bottom pipes. There may be additional separator stages, for example, there may be an overall number of four separator stages, having different pressure levels for optimal separation. The stages may be connected in a serial manner. FIG. 5 illustrates that, according to the present disclosure, code blocks, after segmentation of the initial control code, may follow the functionality and criticality, not the physical pieces of equipment and/or the elements of the process topology.

Related to this example, Table 1 illustrates, the class specific KPIs for the respective class, i.e., monitoring, process critical, and safety critical, of the functions.

Presuming a runtime ecosystem in the form of a distributed, heterogenous computing infrastructure, having dedicated local hardware, e.g., PLCs, an on-premises edge cluster, a 5G MEC, and, optionally, cloud, different deployments are generally available for each class. When it comes to distributing by criticality, for example, safety-critical code may only be run on a (safety) PLC, process-critical code may be deployed on self-owned, on-premises edge clusters, and code related to monitoring may be deployed on self-owned or leased edge clusters, which may differ in the CAPEX/OPEX structure, or 5G MEC. As mentioned above, according to the method of the present disclosure, deployment may be performed such that the requirements are just met. For example, monitoring may be performed on 5G MEC, process critical functions on the on-premises edge cluster, and safety critical functions on the dedicated local hardware.

TABLE 1

Profile example for FIG. 1 (values for illustration only)

| Class | Class-specific KPIs | Instance-specific KPIs | Possible target platforms |
|---|---|---|---|
| Monitoring | Latency: 1 s<br>Fail-overtime: 1 s<br>Redundancy: 0<br>Quality critical: no<br>Safety critical: no<br>Availability: 99.999% | | 5G MEC<br>On-premise edge<br>Dedicated HW,<br>e.g. PLC |
| Process critical | Latency: 50 ms<br>Fail-overtime: 10 ms<br>Redundancy: 1<br>Quality critical: yes<br>Safety critical: no<br>Availability: 99.9999% | Crude level control: 2 signals, 2 internal states at 16bit each | On-premise edge<br>Dedicated HW,<br>e.g. PLC |
| Safety critical | Latency: 20 ms<br>Fail-overtime: 5 ms<br>Redundancy: 2<br>Quality critical: no<br>Safety critical: yes<br>Availability: 99.99999% | | Only on dedicated HW (PLC) |

While the invention has been illustrated and described in detail in the drawings and foregoing description, such illustration and description are to be considered exemplary and not restrictive. The invention is not limited to the disclosed embodiments. In view of the foregoing description and drawings it will be evident to a person skilled in the art that various modifications may be made within the scope of the invention, as defined by the claims.

An advantage of the method of the present disclosure as compared to grouping code into applications (only) based on the process topology is, that for each area, unit, module, or piece of equipment, implementing a process function of the industrial plant, such as, e.g., heating, mixing, or the like, there will always be different categories of code segments automating for example highly critical and noncritical processes. When performing only a grouping by process topology, this means that usually it will not be appropriate to have the respective piece of code run a cloud-based environment, such that the result is that both critical and noncritical services will run locally, and it is not possible to make good use of cloud-based solutions.

A process topology according to the present disclosure has elements each implementing a process function of the industrial plant, such as heating, mixing, and/or filling. An element may be, for example, an area, a unit, a module, or a piece of equipment of the industrial plant.

The present invention can emulate code for a dedicated element of the process topology, while at the same time having portions of the services associated with the element run locally and other portions of the services associated with a hardware module run in a cloud-based environment.

The method of the present disclosure allows for breaking down code into small pieces, optionally even down to individual loops, and provides an automatic investigation into the criticality of certain processes, for example control loops. Criticality means, for example, how fast one would have to react if a service is not executing properly. It may be dependent on whether a service is relevant to safety and/or to product quality. For example, in many cases monitoring data collection may not be particularly critical because neither product quality nor safety are affected in case the monitoring is not continuously and reliably performed or, in different terms, observatory monitoring, which is targeted at human operators or longer-term asset management, has a very high survival time. However, data are used for intervention purposes, for example measurement data for critical process parameters, and services related to said data, may be much more critical.

The method of the present disclosure, particularly, allows for breaking down code in such a manner that the grouping into different categories of criticality can be performed and highly critical services can be performed locally, for example on a traditional PLC, and less critical services may be performed via cloud services, as an example.

The method of the present disclosure may allow for containerizing and deploying the execution units in the least resource-intensive manner. An execution environment that is capable and has low cost for lower performance and deploy the container with the corresponding QoS profile. Functional portions of the executing environment may be, in ascending order of capability and cost, cloud, mobile edge, self-owned edge, and PLC. For example, high priority, low-latency loops might be run on a local edge cluster within one server room or even on a PLC to provide needed state-transfer/fail-over times.

The automatic partitioning according to the present disclosure eliminates the need for an engineer to split the application or define the controllers the applications should finally be executed on, for example for an engineer using e.g., IEC 61131 or IT programming and scripting languages including C, C++ to Python for programming a control application.

The method is independent of concrete programming languages, binary/compiled code formats, the underlying computer architectures, and emulation layers or runtime engines used to execute the segmented (compiled) code as a number of services on the execution environment (e.g., Kubernetes) on a specific architecture (e.g., x86, x64, ARM). Examples are the use of a Java Virtual Machine (JVM), the .NET Common Language Runtime (CLR), or IEC 61131 execution engines that are containerized and then run the actual application code.

The method of the present disclosure may also improve scalability, e.g., when updating or extending applications, and allows for more fine-granular (software-defined) reliability for application parts. Moreover, higher overall application reliability may be obtained, while also employing more "unreliable" computing environments at reduced cost. In addition, when updating an application obtained by the method of the present disclosure, only individual nano services must be updated, which needs almost no spare resources or network load.

The method of the present disclosure may also allow for minimizing CAPEX/OPEX. It may also improve updating capabilities, e.g., may enable light-weight live updates, e.g. for load-evaluate-go, LEG, updates.

Further examples and embodiments of the method according to the present disclosure are provided below.

The method of the present disclosure may comprise, for each of the code blocks, automatically determining a criticality of one or more of the plurality of processes controlled and/or monitored by the code block and automatically assigning the criticality to the code block based on the determination.

Determining the criticality may be performed taking into account key performance indicators associated with the code block, in particular, wherein the criticality may be expressed by a vector of key performance indicators.

The vector of key performance indicators expressing the criticality of a code block may also be referred to, for the sake of brevity, as the vector of the code block. For the sake of brevity, the code blocks may be described as having the vector.

When the criticality is expressed by a vector of key performance indicators, similarity can be determined by a distance metric, wherein similarity of two code blocks may be determined based on a distance between the vectors expressing the criticality of each of the code blocks with respect each other. In other words, the similarity may be determined based on the distance between the vectors of the code blocks with respect to each other.

For example, all code blocks having vectors that, based on the predetermined distance metric, have a distance with respect to each other that is within a predetermined interval may be similar.

Code blocks may be described as being more similar to each other (e.g., more similar than two other code blocks) when the distance between the vectors of the code blocks is lower (e.g., than that of the two other code blocks) according to a/the predetermined distance metric.

The above-mentioned step of automatically creating the plurality of services considering a similarity of the criticality assigned to each of the plurality of code blocks may comprise determining the distance between the vectors of the code blocks with respect to each other.

For example, only code blocks having vectors that, based on the predetermined distance metric, have a distance with respect to each other that is within a predetermined interval may be implemented within the same service. In other words, only code blocks considered to be similar based on the predetermined distance metric may be implemented within the same service. In particular, all code blocks considered to be similar based on the predetermined distance metric may be implemented within the same service.

As mentioned above, in the present disclosure, in the step of automatically creating the plurality of services, in addition to considering a similarity of a criticality assigned to each of the plurality of code blocks, additional criteria may be taken into account.

For example, the additional criteria may comprise that the distance of the vector of a code block with respect to a reference vector is within a predetermined interval. For example, even if, based on similarity alone, the code blocks would be implemented within the same service, they may not be implemented within the same service if the additional criteria are not met, for example, if the distance of the vector of a code block with respect to a reference vector is not within a predetermined interval.

This may avoid generating a service of a group of code blocks that each are similar to their respective nearest neighbor, but that are not particularly similar with respect to one or more other code blocks of the group.

Alternatively, or in addition, for example, the additional criteria may comprise that only code blocks having vectors having one or more key performance indicators that meet predetermined criteria, e.g., that are within a predetermined interval, are implemented within the same service. For example, even if, based on similarity alone, the code blocks would be implemented within the same service, they may not be implemented within the same service if the additional criteria are not met, for example, if one or more of the key performance indicators of their vector is not within a predetermined interval.

This may avoid generating a service of a group of code blocks that may be similar but comprises some code blocks that have requirements exceeding a criticality threshold with code blocks that do not exceed the criticality threshold. This criticality threshold may but need not necessarily correspond to a threshold determining on which functional portion of a heterogenous computing infrastructure the service should be run.

The above-mentioned intervals and/or thresholds may be predetermined, for example predetermined in accordance with the technical requirements and/or technical circumstances, on a case-to-case basis.

In the present disclosure, whenever a, e.g., predetermined, distance metric may be any distance metric known for determining similarity or distance between vectors. It may be predetermined or selected in accordance with the technical requirements and/or technical circumstances, on a case-to-case basis.

The key performance indicators of the present disclosure may comprise, but are not limited to, at least one of availability, reliability, cycle time, redundancy level, application survival time, and recovery time. The measure or quantification of the key performance indicators may be case-dependent, e.g., depend on the technical requirements and/or technical circumstances.

Availability and reliability may be defined, e.g., according to a standard such as IEC 61907 or 3GPP TS 22.261, for example as follows.

The reliability may be expressed as follows: $R_{(t)}=e^{-\lambda t}=e^{-(t/m)}$, where $R_{(t)}$ is the reliability, $\lambda$ is the failure rate, m is the mean time between failures (MTBF), where $m=1/\lambda$ Thus, $m=t/\log_{(n)}(1/R_{(t)})$. MTBF as such may alternatively be used as a measure for the reliability.

The availability may be expressed by the following expressions:

$$\frac{\text{Up time}}{\text{Total time}} \text{ or } \frac{\text{Mean up time}}{\text{Mean up time} + \text{Mean down time}} \text{ or } \frac{MTBF}{MTBF + MDT},$$

where MTBF is the mean time between failures and MDT is the mean down time.

In the present disclosure, the application cycle time is the duration during which a control loop, based on sensing input, issues potentially new actuation on the controlled process, i.e., it includes time for sensing and signal processing, transmission, control logic calculation, transmission, output processing/actuation. From this, communication latency and worst-case execution time for a service can be derived. Cost may be given as currency per execution period.

An example for a metric will be provided below for illustration. Presuming a pair of vectors v_req for the service and v_env for the compute environment. One basic example is a metric where the pairwise difference of elements v_env− v-reg must be positive or zero where higher values are better (e.g., availability) or negative or zero where lower values are better (e.g. cost or latency). This can be expressed as (v_end−v_reg)*v_mirr>=0 where v_mirr contains 1 where larger values are better, −1 where smaller values are better.

Some elements of the vector might be non-negotiable such as safety-certification of a PLC, others such as availability might be traded against lower cost. An example is presuming a compute platform that offers 99.9% availability as needed by a service at 1 EUR/day and another offers 99% at 49 c/day, the same service could be started twice on the low-cost platform at 98 c/day with an availability of even 99.99%.

Similarly, communication latency and service execution time might be traded when the overall application cycle time is the key decision factor.

The method of the present disclosure may comprise automatically breaking down the initial control code to obtain a plurality of candidate code blocks for controlling and/or monitoring a plurality of processes carried out by one or more pieces of equipment of the industrial plant. Furthermore, the method of the present disclosure may comprise automatically determining whether the candidate code blocks are to be used as the plurality of code blocks. The determining may comprise determining whether at least one criterion is met by the plurality of candidate code blocks, upon determining that the criterion is met, using the plurality of candidate code blocks as the plurality of code blocks, and upon determining that the criterion is not met, determining that the plurality of candidate code blocks are not to be used as the plurality of code blocks. Optionally, the method may comprise upon determining that the plurality of candidate code blocks are not to be used as the plurality of code blocks, modifying, in particular merging or further breaking down the plurality of candidate code blocks to obtain a plurality of modified candidate code blocks.

In other words, candidate code blocks may be determined and then a decision process may be performed that determines whether these candidate code blocks are to be used as the plurality of code blocks mentioned further above, i.e., the code blocks that are used for automatically creating the plurality of services considering a similarity of a criticality assigned to each of a plurality of code blocks. Otherwise, the candidate code blocks may be modified.

The steps of breaking down initial control code to obtain candidate code blocks and optionally merging candidate code blocks may be seen as being part of segmenting the initial control code into code blocks.

The at least one criterion may reflect the expected amount of overhead in the control application when using the plurality of candidate code blocks as the plurality of code blocks and/or required reliability and/or required availability associated with the code block, optionally also considering the added overhead from using an emulator or runtime engine to execute the actual code. Determining whether the criterion is met may comprise determining whether the expected amount of overhead remains below a predetermined threshold and/or determining whether reliability and/or availability meet a similarity requirement.

In the present disclosure, overhead may refer to at least one of additional memory, computation, and communication footprint to run a particular set of candidate code blocks and exchange (previously internal) data between them, particularly while matching given timing constraints.

Determining whether the criterion that may be used for determining whether the candidate code blocks are to be used is met may, alternatively or in addition, comprise comparing a criticality and/or function that are comprised in each of the candidate code blocks among each other or with those of other candidate code blocks.

Alternatively, or in addition, determining whether the criterion is met may comprise determining whether the candidate code blocks have a suitable size or may need to be decreased or increased in size.

As an example, the initial control code may be broken down so as to obtain a plurality of candidate code blocks, each representing a single function and/or a single loop. It may then be determined, by applying a predetermined criterion, e.g., by determining that several among the plurality of code blocks have the same or very similar criticality and/or by determining that they have the same function in the context of the processes, that they may be merged to form one or more modified candidate code blocks being bigger than the previous candidate code blocks. Alternatively, or in addition, the initial control code may be broken down into candidate code blocks comprising multiple functions and/or loops and it may be determined that the criticality of functions and/or loops within the candidate control block are spread out too much. The candidate code blocks may then be further broken down to obtain a plurality of modified code blocks being smaller than the previous candidate code blocks.

The creation and, where necessary, modification of candidate control blocks may ensure that the criticality to be used for automatically creating the plurality of services can be defined efficiently and sufficiently accurately for the control blocks.

For the sake of explanation, criteria for segmenting code, particularly, for breaking the code down into candidate code blocks and/or merging candidate code blocks, and for grouping code blocks into services may overlap, particularly, in case of criteria that aim at grouping pieces of code that are similar in terms of certain characteristics, e.g., criticality. However, the criteria are usually not entirely congruent.

The method of the present disclosure may comprise, repeating, for the plurality of modified candidate code blocks, the determining whether the candidate code blocks are to be used as the plurality of code blocks and otherwise, i.e., upon determining that the plurality of candidate code blocks are not to be used as the plurality of code blocks, modifying, in particular merging or further breaking down, the plurality of candidate code blocks to obtain a plurality of modified candidate code blocks.

That is, obtaining the code blocks from candidate code blocks may be an iterative process that comprises repeatedly modifying the candidate control blocks until they are considered suitable for use in automatically creating the services. This allows for obtaining code blocks that are as close as possible to ideal for automatically creating the services.

The criteria for determining whether the candidate code blocks are to be used as the plurality of code blocks may not be the same for all iterations. For example, one or more iterations may have criteria relating to function and one or more other iterations may have criteria relating to criticality, or they may each relate to function and criticality with different relative weights.

The breaking down the initial control code to obtain a plurality of candidate code blocks may comprise breaking down the code into units of a predetermined size, in particular, into functions and/or into the smallest possible units, such as code implementing a single control loop.

This constitutes a very simple and efficient manner of providing candidate code blocks. Accordingly, the starting point for finding the code blocks can be found quickly and efficiently and by applying the steps of, optionally repeatedly, modifying the candidate code blocks, the code blocks can be determined in an efficient and reliable manner. Smallest possible units may, for example, be code implementing single loops.

The code of a single control loop may consist of one input variable to represent the measured process variable, a controller output to influence the behavior of an actuator, a setpoint indicating the targeted value of the process variable that the associated control code is supposed to ensure.

The method of the present disclosure may comprise, for one or more of the plurality of services, automatically determining, for example based on the criticality of the code block or code blocks implemented by the service, an overall criticality of the service, and, based on the overall criticality of the service, automatically determining on which functional portion, in particular what type or an instance of a runtime environment, such as a local controller, an edge node, or a cloud server, of a distributed, heterogeneous computing infrastructure the service should be run, in particular, whether the service should be run locally, on an edge node, or in the cloud.

This allows for improved leveraging of the technical advantages of each of the functional portions and, accordingly, the capability of the overall heterogenous computing infrastructure. In particular, it allows for distributing the entire control application over the infrastructure according to respective requirements of the services and the capabilities of the functional portions. This can be done without creating an excessive amount of overhead.

Specifically, as already mentioned above, the different functional portions of an infrastructure may have different technical capabilities, for example in terms of response times, availability, or the like. Each service may be run on the functional portion that just meets the requirements of the service, i.e., that overfulfills the requirements by the lowest possible amount while still meeting the requirement.

As an example for determining the overall criticality of the service based on the criticality of the code block or code blocks, the overall criticality may correspond to that of the code block having the highest criticality.

The automatically determining on which functional portion of a distributed, heterogeneous computing infrastructure the service should be run may comprise assigning the service to the functional portion.

Determining on which functional portion the service should be run is to be seen in terms of determining a portion of the infrastructure in terms of its functional category. For example, determining on which functional portion the service should be run may, but does not necessarily include that a specific individual node or server is determined. For example, it may entail that it is only determined that the service should be run on an edge or a PLC or a cloud server, without specifying which of a plurality of available edge nodes of an edge cluster or which of a plurality of available PLCs or which of a plurality of available cloud servers, respectively.

A functional portion, in the present disclosure, may be a type or an instance of a runtime environment, for example, as mentioned above.

Automatically determining on which functional portion of a distributed, heterogeneous computing infrastructure the service should be run may comprise accessing information that specifies the computing infrastructure, e.g., a given hardware environment, determining from the information the available functional portions, and based thereon, assigning the service to one of the available functional portions. Alternatively, or in addition, determining on which functional portion of a distributed, heterogeneous computing infrastructure the service should be run may comprise determining a suitable configuration of a distributed heterogeneous computing infrastructure, in particular, determining suitable functional portions to be included in a distributed heterogeneous computing infrastructure, and assigning the service to one of the functional portions. For example, the determining on which functional portion of a distributed, heterogeneous computing infrastructure the service should be run may comprise determining a hardware environment, for example, from a given catalogue of components. The determining the suitable configuration may be performed within predetermined constraints, e.g., availability of functional portions.

It is noted that the skilled person may, for example, select a known architecture that allows for executing applications running on different functional portions of a distributed, heterogenous computing infrastructure, to implement the running of the different services on the determined functional portions. For example, some network-centric architectures, e.g., with ABB's Select I/O, may already provide the possibility to run an application on any dedicated process controller and/or host that is attached to the network.

The method of the present disclosure may comprise, for each of one or more of the plurality of services, storing a/the overall criticality and/or a/the functional portion of a/the distributed, heterogeneous computing infrastructure on which the service should be run, in such a manner that the overall criticality and/or functional portion is accessible to a computing system executing the control application. As an example, the computing system executing the control application may be a/the distributed, heterogeneous computing infrastructure In other words, once the criticality and/or the suitable functional portion has been determined, they may be stored for later use. Thus, in case a service is replicated for use, the stored criticality may directly be used for determining on which functional portion of the infrastructure should be run. In some cases, the stored functional portion may even directly be used as the functional portion on which the service should be run. It may depend on the context whether the stored functional portion is used directly or whether a functional portion is determined from the stored criticality.

The storing may be performed on any suitable computer readable memory, which may be part of the distributed, heterogeneous computing infrastructure. For example, the information may be stored in a database.

Determining on which functional portion of a distributed, heterogeneous computing infrastructure the service should be run may comprise determining, for each of the functional portions of the distributed, heterogeneous computing infrastructure, a distance between a requirement vector of the service and a capability vector of the functional portion based on a predetermined distance metric. Alternatively, or in addition, determining on which functional portion of a distributed, heterogeneous computing infrastructure the service should be run may comprise determining, for each of the functional portions of the distributed, heterogeneous computing infrastructure, whether one or more of the entries of a/the capability vector of the functional portion are equal to or greater than a corresponding entry in a/the requirement vector of the service.

As an example, determining on which functional portion of a distributed, heterogeneous computing infrastructure the service should be run may comprise determining, for a predetermined set of entries of the requirement vector of the service and a corresponding set of entries of the respective capability vector of each of the functional portions, whether the entries of the capability vector are equal to or greater than the entries of the requirement vector, and if this is the case, determining that the functional portion is suitable for running the service. The determining may comprise determining, among the suitable functional portions, the functional portion with the capability vector having the smallest distance with respect to the requirement vector. This functional portion may be determined to be the functional portion on which the service should be run. Alternatively, the order may be reversed. Other combinations of the above criteria and, optionally, additional criteria, may be applied.

The requirement vector may correspond to the above-described vector expressing criticality. Each entry of the capability vector corresponds to an entry in the requirement vector and indicates the maximum capability the functional portion provides in terms of the requirement expressed by the requirement entry.

For example, an entry in the requirement vector may be a value representing the minimum required availability and the entry in the capability vector may represent the maximum availability the functional portion can provide.

As such, the requirement and capability vectors can be used, for example, for determining whether a functional portion can perform the service and/or for selecting the functional portion that overperforms the least.

In some cases, two functional portions may be equally suitable, for example in terms of the above-described evaluation that is based on the vectors. In that case, other factors may be considered. For example, there may be a boundary condition that yields a default for cost or a default for safety decision in case of otherwise equally suitable functional portions.

It is noted that there are cases in which, in order to obtain entries for the capability vector and the requirement vector that can be compared, a translation or transformation of capabilities and/or characteristics of the functional portions and/or the requirements of the services is performed.

The method of the present disclosure may comprise, for at least one element of a process topology if the industrial plant, e.g., for at least one of an area, a unit, a module, or a piece of equipment of the industrial plant, automatically identifying a subset of the plurality of services that are involved in controlling and/or monitoring the element of the process topology, and assembling the subset into an element-specific code package while keeping the services separate within the code package.

As an example, all services related to a given element may be identified as being part of the element-specific code package. An advantage of this is that when setting up an element of the process topology with the same configuration, this would allow for using the same set of services as the ones of the element-specific code package. It is to be understood that keeping the services separate means that the control code, after assembling, is not the same as the initial control code, i.e., the control code prior to the segmenting. In other words, the services remain intact.

The method of the present disclosure may comprise automatically generating glue code, the glue code being configured to ensure that any changes made to the initial code while segmenting the initial code and creating the services does not break the functionalities of the initial code, in particular, configured to allow for complete integration of the services.

Generating glue code may include, but is not limited to, generating additional I/O variables, for example with corresponding data size and/or communication service quality like latency or redundancy, to allow for exchanging, particularly previously internal, variables, for example exchanging previously internal variables across code blocks that were separated while segmenting the initial control code. Generating glue code may include generating additional I/O variables together with communication QoS to transfer data which after the segmenting must be shared among at least two services.

It is noted that, particularly since the exchange of variables will generally be traceable in the initial control code, the skilled person would know how to implement an automatic generation.

The invention also provides a use of the control application provided by any of the methods of the present disclosure for controlling and/or monitoring the operation of an industrial plant.

In particular, the use may comprise carrying out the control application in a distributed computing system comprising a local computing system situated at the site of the industrial plant, at least one of an edge computing system associated with the industrial plant, and a cloud computing system. For example, the different services of the control application may be run on different functional portions of the computing system.

Carrying out the control application may comprise carrying out a first subset of the services on the local computing system, and at least one of carrying out a second subset of the services on the edge computing system and carrying out a third subset of the services on the cloud computing system. The determining on which functional portion the respective subset of services should be carried out may be performed as described above in the context of the method of the present disclosure.

The invention also provides a data processing system comprising means for carrying out the computer-implemented method of the present disclosure. The data processing system may be implemented as a distributed computing system or as a centralized computing system, for example, a computer. The data processing system may comprise at least a processor, and optionally a memory unit.

The invention also provides a computer program product comprising instructions which, when the program is executed by a computer, cause the computer to carry out any of the methods of the present disclosure.

The invention also provides a computer-readable medium comprising instructions which, when executed by a computer, cause the computer to carry out any of the methods of the present disclosure.

The features and advantages outlined above in the context of the method similarly apply to the use, the data processing system, the computer program product, and the computer-readable medium described herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for providing a service-based control application for an industrial plant, the method comprising:

automatically segmenting an initial control code for the industrial plant into a plurality of code blocks;

automatically creating a plurality of services, each service implementing the functionality of one or more of the plurality of code blocks, wherein the automatically creating of the plurality of services is carried out considering a similarity of a criticality assigned to each of the plurality of code blocks, such that code blocks having more similar criticality are more likely to be implemented within the same service, and determining, automatically for each of the plurality code blocks, a criticality of one or more of the plurality of processes controlled or monitored by one code block of the plurality of code blocks and automatically assigning the criticality to the one code block based on the determination, wherein determining the criticality is performed considering key performance indicators (KPIs) associated with the one code block, the KPIs including cycle time, required redundancy level, survival time, or fail-over time.

2. The method of claim 1, wherein the criticality is expressed by a vector of KPIs or wherein the KPIs are derived by analyzing signal tag names to identify the type of controlled physical quantity or by analyzing severity of alarms or events associated with a signal.

3. The method of claim 1, further comprising:

automatically breaking down the initial control code to obtain a plurality of candidate code blocks for controlling or monitoring a plurality of processes carried out by one or more pieces of equipment of the industrial plant; and automatically determining whether the candidate code blocks are to be used as the plurality of code blocks, the determining comprising:

determining whether at least one criterion is met by the plurality of candidate code blocks, upon determining that the criterion is met, determining that the plurality of candidate code blocks is to be used as the plurality of code blocks, and upon determining that the criterion is not met, determining that the plurality of candidate code blocks is not to be used as the plurality of code blocks.

4. The method of claim 3, further comprising:

upon determining that the plurality of candidate code blocks is not to be used as the plurality of code blocks, merging or further breaking down the plurality of candidate code blocks to obtain a plurality of modified candidate code blocks.

5. The method of claim 4, further comprising repeating, for the plurality of modified candidate code blocks, the determining whether the candidate code blocks are to be used as the plurality of code blocks and otherwise merging or further breaking down the plurality of candidate code blocks.

6. The method of claim 4, wherein the at least one criterion reflects an expected amount of overhead in the control application when using the plurality of candidate code blocks as the plurality of code blocks or required reliability or required availability associated with the code block.

7. The method of claim 4, wherein the breaking down the initial control code to obtain the plurality of candidate code blocks comprises breaking down the code into units of a predetermined size.

8. The method of claim 7, wherein the units of the predetermined size include functions or smallest possible units, including code implementing a single control loop.

9. The method of claim 1, further comprising:

determining, automatically for one or more of the plurality of services, based on the criticality of the code block or code blocks implemented by the service, an overall criticality of the service; and based on the overall criticality of the service, automatically determining on which functional portion, on what type, or on which instance of a runtime environment, the runtime environment including a local controller, an edge node, or a cloud server, of a distributed, heterogeneous computing infrastructure, the service should be run, wherein the automatically determining on which functional portion the service should be run includes whether the service should be run locally, on an edge node, or in the cloud, wherein determining on which functional portion of the distributed, heterogeneous computing infrastructure the service should be run comprises at least one of:

determining, for each of the functional portions of the distributed, heterogeneous computing infrastructure, a distance between a requirement vector of the service and a capability vector of the functional portion based on a predetermined distance metric; or determining, for each of the functional portions of the distributed, heterogeneous computing infrastructure, whether one or more of the entries of the capability vector of the functional portion is/are equal to or greater than a corresponding entry in a requirement vector of the service.

10. The method of claim 1, further comprising automatically generating a glue code, the glue code being configured to ensure that any changes made to the initial code while segmenting the initial code and creating services does not break functionalities of the initial code, wherein the glue code is configured to allow for complete integration of services, and wherein automatically generating the glue code comprises generating additional I/O variables, together with communication QoS, to transfer data which after the segmenting must be shared among at least two services.

11. The method of claim 1, wherein, for the segmenting or the creating of the services, indicators are derived from the initial control code, or from a distributed control system.

12. A computer-implemented method for providing a service-based control application for an industrial plant, the method comprising:

automatically segmenting an initial control code for the industrial plant into a plurality of code blocks;

automatically creating a plurality of services, each service implementing the functionality of one or more of the plurality of code blocks, wherein the automatically creating of the plurality of services is carried out considering a similarity of a criticality assigned to each of the plurality of code blocks, such that code blocks having more similar criticality are more likely to be implemented within the same service;

determining, automatically for one or more of the plurality of services, based on the criticality of the code block or code blocks implemented by the service, an overall criticality of the service;

based on the overall criticality of the service, automatically determining on which functional portion, on what type, or on which instance of a runtime environment, the runtime environment including a local controller, an edge node, or a cloud server, of a distributed, heterogeneous computing infrastructure, the service should be run, wherein the automatically determining on which functional portion the service should be run includes whether the service should be run locally, on an edge node, or in the cloud; and for each of one or more of the plurality of services, storing an overall criticality and a functional portion of a distributed, heterogeneous computing infrastructure on which the service should be run, such that the overall criticality or the functional portion is accessible to a computing system executing the control application.

13. A computer-implemented method for providing a service-based control application for an industrial plant, the method comprising:

automatically segmenting an initial control code for the industrial plant into a plurality of code blocks;

automatically creating a plurality of services, each service implementing the functionality of one or more of the plurality of code blocks, wherein the automatically creating of the plurality of services is carried out considering a similarity of a criticality assigned to each of the plurality of code blocks, such that code blocks having more similar criticality are more likely to be implemented within the same service; and for at least one element of a process topology of the industrial plant, automatically identifying a subset of the plurality of services that are involved in controlling or monitoring the element of the process topology and assembling the subset into an element-specific code package while keeping the services separate within the code package, wherein the at least one element of the process topology of the industrial plant includes at least of an area, a unit, a module, or at least one piece of equipment of the industrial plant.

14. A computer-implemented method for providing a service-based control application for an industrial plant, the method comprising:

automatically segmenting an initial control code for the industrial plant into a plurality of code blocks;

automatically creating a plurality of services, each service implementing the functionality of one or more of the plurality of code blocks, wherein the automatically creating of the plurality of services is carried out considering a similarity of a criticality assigned to each of the plurality of code blocks, such that code blocks having more similar criticality are more likely to be implemented within the same service; and automatically generating a glue code, the glue code being configured to ensure that any changes made to the initial code while segmenting the initial code and creating services does not break functionalities of the initial code.

\* \* \* \* \*